No. 622,888. Patented Apr. 11, 1899.
J. B. FORSYTH.
VALVE FOR ENDLESS TUBING FOR TIRES.
(Application filed Oct. 22, 1896.)
(No Model.)
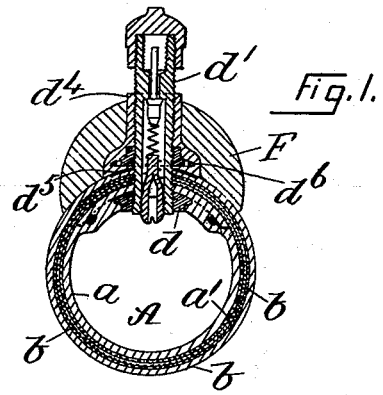
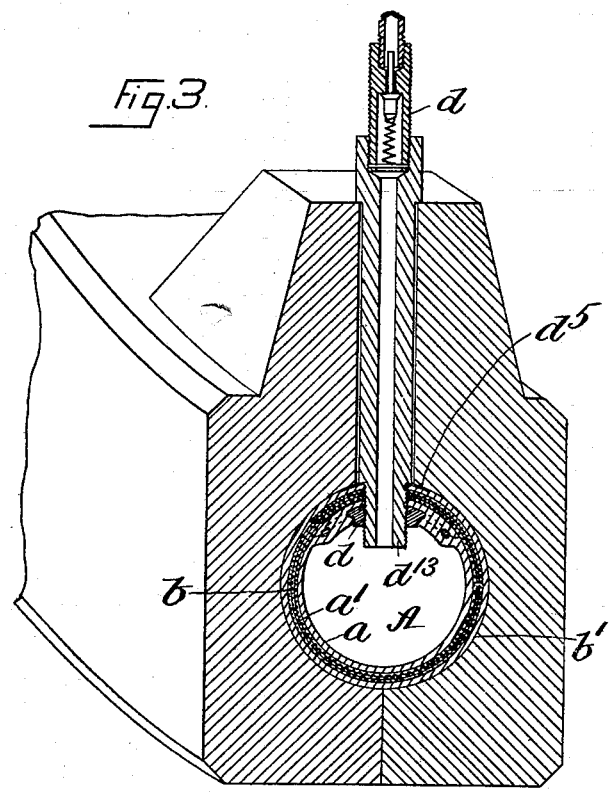
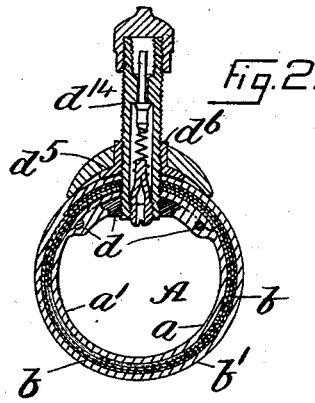
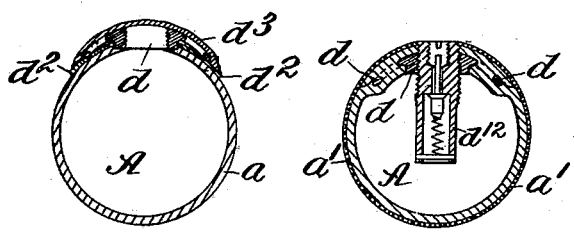
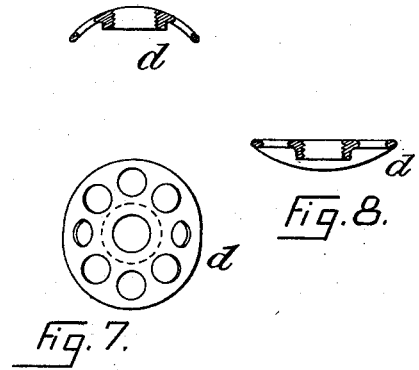
Witnesses:
H. P. Guillo
John R. Snow
Inventor:
James Bennett Forsyth
By Maynadier & Mitchell,
Attorneys.

UNITED STATES PATENT OFFICE.

JAMES BENNETT FORSYTH, OF BOSTON, MASSACHUSETTS.

VALVE FOR ENDLESS TUBING FOR TIRES.

SPECIFICATION forming part of Letters Patent No. 622,888, dated April 11, 1899.

Application filed October 22, 1896. Serial No. 609,774. (No model.)

*To all whom it may concern:*

Be it known that I, JAMES BENNETT FORSYTH, of Boston, in the county of Suffolk and State of Massachusetts, have invented a new and useful Improvement in Valves for Endless Tubing for Tires and other Uses, of which the following is a specification, reference being had to the accompanying drawings, in which—

Figure 1 is a section of my tire on the rim of a bicycle-wheel, illustrating the valve-case used in the finished tire. Fig. 2 is a section of my tire on a vulcanizing-ring, illustrating the valve-case used during the vulcanizing operation when my tire is vulcanized on a ring. Fig. 3 is a section of my tire in the vulcanizing-mold, illustrating the valve used during the vulcanizing operation when my tire is vulcanized in molds. Fig. 4 is a section of the inner portion of my tire before the outer layers are applied. Fig. 5 is a section similar to Fig. 4, except that an outer layer of light cloth frictioned or coated with rubber compound has been applied and also a temporary valve projecting inside the tube has been connected with the flanged nut and the tube has been inflated. Figs. 6, 7, and 8 are views of my flanged nut.

The object of my invention is to improve the manufacture of tires made up of layers of vulcanized material by applying a flanged nut to the inner portion or layer and then forming the outer layers or portion about this nut and after the tire is thus formed by perforating the plies or layers making up the outer portion over the bore of the flanged nut and screwing the valve-case into that nut.

The tire shown in the drawings is made as described in my pending application, Serial No. 610,728, filed October 31, 1896; but my present invention is of course applicable to all tires formed of a core or inner layers A and outer layers B.

The inner portion A is formed of rubber compound and the flanged nut applied to its exterior; but to make a perfectly secure joint I cement a disk $d^2$, of rubber compound, to inner portion A to aid in holding the flanged nut $d$, (see Figs. 6, 7, and 8,) preferably of copper cleansed with a solution of sulfuric acid in water in the usual way, filling the holes in the flange of the nut with rubber compound, and then cover the flanged nut with a disk $d^3$, of rubber compound, cemented in place. After the nut $d$ is thus applied the tube of rubber compound A is covered with the cloth $a'$, except at its ends, which are left bare, and the ends of the tube of rubber compound are then joined, preferably by inserting one end into the other and cementing them together, and a strip of thin cloth is wrapped about the joint to finish the tubular core A. It is desirable to introduce a small quantity of water (about a gill for a tubular tire of average size for a bicycle-tire) before its ends are joined. The rubber and cloth covering the bore of the nut $d$ are then cut away and the valve-case $d^{12}$ screwed into the nut, as shown in Fig. 5. The endless tube A is then inflated to keep it in shape, a few pounds of internal air-pressure to the square inch being sufficient, and this inflation changes the shape from that shown in Fig. 4 to that shown in Fig. 5; but all these details of construction may obviously be much modified, as all that is requisite is that it be so far finished as to serve as a core upon which the outer layers can be applied. After the unvulcanized tire has been prepared the cloth and rubber over the flanged nut $d$ are cut away and the valve-case $d^{12}$ taken out and replaced by a modified form of valve-case $d'$, as in Fig. 3, if the tire is to be vulcanized in molds, or by a different form of valve-case $d'$, as in Fig. 2, if the tire is to be vulcanized on a ring, and the tire is vulcanized as usual and as will be fully understood without further description. After vulcanization the valve-case $d'$ (shown in Fig. 1) is substituted for the valve-case used when the tire is vulcanized, and the rubber nipple $d^4$ is placed over valve-case $d'$ of Fig. 1, so as to form a cushion between valve-case $d'$ and rim F of the bicycle-wheel.

The washer $d^5$ (shown in Figs. 1, 2, and 3) is best applied before vulcanizing the tire.

While the main advantage of my flange-nut $d$ is that it is out of the way while forming the outer portion B over inner portion A, it is also important in the practical manufacture of tires, for the reason that it admits of using valve-cases to suit either vulcanizing in molds or vulcanizing upon rings and in addition makes the finished tire far superior to any before known, so far as the valve is concerned.

I am aware of the patent to Genet, No. 511,693, dated December 26, 1893, which shows a valve-holder described as "vulcanized in place;" but the central part of that holder extends through the outer layers and is not between the inner and outer layers, nor is it covered by the outer layers, and I disclaim all shown in that patent and all other valve-holders which are not between the inner and outer layers of the tire and covered by the outer layers, the distinguishing feature of my invention being that the valve-holder is between the inner and outer layers of the tire and covered by the outer layers, so that a hole must be made through the outer layers before the valve-case can be engaged with the holder.

What I claim as my invention is—

A pneumatic tire made up of an inner tube and a plurality of layers of vulcanizable material; a flanged nut secured to the inner tube and between the outer wall of the inner tube and the outer layers, the inner tube, outer layers and flanged nut being vulcanized together; and a valve-case with an exterior screw-thread which valve-case extends through the outer layers and engages the flanged nut substantially as described.

JAMES BENNETT FORSYTH.

Witnesses:
  JOHN R. SNOW,
  WM. MAYNADIER.